United States Patent
Adamczak et al.

(10) Patent No.: US 7,638,736 B2
(45) Date of Patent: Dec. 29, 2009

(54) METHOD AND DEVICE FOR COOKING WITH STEAM

(75) Inventors: Juergen Adamczak, Leopoldshoehe (DE); Uwe Berger, Kirchlengern (DE); Hartmut Dittrich, Buende (DE); Thomas Metz, Buende (DE); Dirk Telthoerster, Buende (DE); Stefan Homburg, Buende (DE)

(73) Assignee: Miele & Cie. KG, Guetersloh (DE)

( * ) Notice: Subject to any disclaimer, the term of this patent is extended or adjusted under 35 U.S.C. 154(b) by 213 days.

(21) Appl. No.: 11/535,275

(22) Filed: Sep. 26, 2006

(65) Prior Publication Data

US 2007/0068918 A1    Mar. 29, 2007

(30) Foreign Application Priority Data

Sep. 26, 2005   (DE) .................. 10 2005 046 011
Nov. 24, 2005   (DE) .................. 10 2005 056 371

(51) Int. Cl.
*A21B 1/00*    (2006.01)
*A47J 27/00*   (2006.01)

(52) U.S. Cl. ................ 219/401; 219/400; 219/402; 219/403; 219/404; 219/413; 219/431; 99/467; 99/468; 99/339; 99/473; 99/475; 126/20; 126/20.2; 126/369; 126/369.1; 126/369.2; 126/369.3; 126/348; 426/510; 426/511

(58) Field of Classification Search ............ 219/400, 219/401–4, 413, 431; 99/330, 467–8, 339, 99/473–5; 126/20, 20.2, 369, 369.1, 369.2, 126/369.3, 348; 426/510–11
See application file for complete search history.

(56) References Cited

U.S. PATENT DOCUMENTS 4,655,192 A *   4/1987   Jovanovic ............ 126/20
2004/0226934 A1  11/2004  Moore et al.

FOREIGN PATENT DOCUMENTS

| DE | 41 16 425  | 1/1992 |
| DE | 19638664   | 3/1998 |
| EP | 1 108 384  | 6/2001 |
| FR | 2642290    | 8/1990 |

OTHER PUBLICATIONS

European Search Report, EP 06 01 9218, mailing date: Jan. 27, 2009.

* cited by examiner

*Primary Examiner*—Shawntina Fuqua
(74) *Attorney, Agent, or Firm*—Darby & Darby (57) ABSTRACT

A method for steam cooking includes introducing steam, from a steam generator device, into a food cooking container through a supply conduit so that at an inlet opening to the food cooking container the steam enters tangentially to a wall of the food cooking container. The generation of steam is controlled by a control system so as to provide a difference between the pressure in the supply conduit and the pressure in the interior of the food cooking container of at least 1 kPa.

18 Claims, 10 Drawing Sheets

METHOD AND DEVICE FOR COOKING WITH STEAM

Priority is claimed to German patent application DE 10 2005 046 011.9, filed Sep. 26, 2005 and German patent application DE 10 2005 056 371.6, filed Nov. 24, 2005, which are hereby incorporated by reference herein.

The present invention relates to a method and device for cooking with steam.

BACKGROUND

Cooking with steam is becoming more and more popular. Meanwhile, quite a number of different systems that allow foods and comestibles to be heated and cooked using steam are known in practical applications and the literature.

Document EP 1 108 384 B1 describes a household appliance for steam cooking under atmospheric pressure, which is designed in the manner of the long-known conventional household ranges that use convection and/or infrared heaters. The aforementioned steam-cooking appliance has a housing having an oven chamber disposed therein. Cooking containers for holding the food to be cooked can be inserted at various levels in corresponding guide tracks of the oven chamber. The cooking containers used here are in the form of open pans. The appliance also has a water reservoir for storing water and a steam generator in which the water is heated to steam. The steam is then introduced into the oven chamber, where it comes directly into contact with the food to be cooked. A suitable control system and a temperature sensor disposed in the cooking chamber are used to control the supply of steam, i.e., to control the steam-cooking process.

Steam cooking appliances of the type described above produce excellent results in terms of the quality of the foods processed therein, but they have the disadvantage of requiring a complex housing design, which is why they can be expensive. Moreover, an appliance of this type requires a corresponding amount of space to be available in the kitchen.

Document DE 41 16 425 A1 describes a steam cooking appliance in which the food to be cooked can be heated both by conventional heating systems, such as top heat and bottom heat, and by supplying steam. The primary point of that appliance is to bring the steam generated in a steam generator to a temperature above 100° C. using a controllable steam superheater before the steam is introduced into the cooking chamber or into a closed cooking container. The intention of this is to allow for cooking at high temperatures in order, for example, to achieve a browning effect on the food to be cooked.

That prior publication describes the use of a closed cooking container including a food pan and a lid. In order to carry out the steam cooking operation, the cooking container is placed on a support device in the oven chamber of the range and must be connected to a flexible steam conduit, so that the steam can be introduced into the cooking container therethrough. The flexible supply conduit is connected to the steam generator device via a steam connection coupling in the door of the appliance and further conduits running in the housing.

A steam cooking appliance in which two-part closed cooking containers are used is also known from U.S. Pat. No. 4,655,192. A plurality of cooking containers can be disposed one above the other. Each cooking container is supplied with steam by a separate steam generator, the steam being introduced into the interior of the cooking container through a nozzle.

The designs according to DE 41 16 425 A1 and U.S. Pat. No. 4,655,192 allow a plurality of cooking containers to be placed in the cooking chamber of these appliances and to be independently supplied with steam via a steam supply conduit. However, they have the disadvantage that no provision is made to allow excess steam, and steam that is too cold, to be discharged to the outside, if necessary.

In these designs, the excess steam would only be able to escape when, after sufficient pressure has built up, the lid of the cooking container lifts off, so that excess air can escape from the cooking container, just as when cooking with a normal cooking pot on a cooktop burner. The disadvantage here is that the repeated lifting off of the lid produces the known fluttering or rattling noises and, moreover, that food to be cooked may escape from the container during this process. Furthermore, appliances of this design do not allow for a precisely controlled and regulated steam cooking process because there is no temperature control.

Furthermore, these appliances have an overall complex design because, in addition, they work with the assistance of conventional heating and always require an interior housing in which to place the food cooking containers.

As against this, steam cooking appliances have recently come onto the market that are very simple in design. These appliances only have a base which accommodates the steam generator and the control system thereof. The cooking containers for the food to be cooked are stackable one above the other and have openings in the base and lid parts for passing the steam therethrough. The steam generated in the base portion of the appliance is passed through the cooking containers from bottom to top, the excess steam being able to escape in the upper lid area.

These appliances are simple in design and inexpensive to manufacture, but it is not possible to achieve controlled cooking results of good quality using these appliances. For the reason alone that the steam must travel a long distance from the bottom cooking container to the top cooking container, passing over the foods located therein, proper cooking is hardly possible at the upper levels. Generally, the cooking containers then have to be rearranged here in order to allow the foods from the higher levels to cook further.

SUMMARY

It is an object of the present invention to provide a method for cooking with steam, which makes it possible to achieve high-quality cooking results.

The present invention provides a method for steam cooking. The method includes: introducing steam, from a steam generator device, into a food cooking container through a supply conduit so that at an inlet opening to the food cooking container the steam enters tangentially to a wall of the food cooking container; and controlling a generation of the steam by a control system so as to provide a difference between a pressure in the supply conduit and a pressure in an interior of the food cooking container of at least 1 kPa.

An advantage provided by the method according to the present invention is that high-quality cooking results can be achieved.

BRIEF DESCRIPTION OF THE DRAWINGS

Exemplary embodiments of the present invention are in the drawings in a schematic way and will be described in more detail below. In the drawings.

DETAILED DESCRIPTION

The entering steam is not directed directly toward the food, because this would lead to undesired cooking results. Altogether, due to the arrangement of the supply lines, the steam is uniformly distributed in the food cooking container, allowing a uniform cooking process to take place in all parts of the food that has been filled in. Furthermore, the high speed of the entering steam causes the fresh steam to effectively mix with the air present in the food cooking container before the steam, i.e., the steam/air mixture, hits the surface of the food to be cooked.

In the process, the steam is introduced into the food cooking container in a controlled manner. The insertion of a temperature sensor into the food cooking container allows the cooking process to be regulated and matched to the individual foods. This makes it possible to obtain optimal and high-quality cooking results with low energy consumption and a small excess of steam. Too high an excess of steam may be detrimental to the kitchen furniture and the kitchen. Possible consequence may include the formation of mold stains.

In an embodiment of the teaching according to the present invention, a flow-guide element gives the steam a predetermined direction as it enters the food cooking container, so that its flow path from the inlet to an outlet of the food cooking container is maximized. This prevents the possibility of a short-circuit occurring between the steam inlet and the steam outlet, which would result in low efficiency.

In an embodiment of the aforementioned embodiment, the flow-guide element directs the steam entering the food cooking container away from a temperature sensor at least partially located in the food cooking container. This allows measurement of actual conditions in the food cooking container without the possibility of the temperature sensor being negatively affected by steam entering from the steam inlet.

In another embodiment of the method of the present invention, the appliance control system controls or regulates the generation of steam in such a way that the pressure in the interior of the food cooking container does not exceed about 0.3 kPa during the cooking process. Thus, for example, conventional food cooking containers having a base part and a lid part can be used without the lid part briefly lifting off of the base part during cooking, which might happen at higher internal pressures. In principle, this would also be possible within the scope of the present invention, but it is generally preferred to discharge air and steam in a controlled manner through a defined discharge opening.

Another, alternative object of the present invention is to provide a device for cooking with steam in such a way that an appliance is provided which is simple in construction, allows for a compact and space-saving design, and makes it possible to achieve high-quality cooking results. Moreover, the cooking appliance is intended to be easy to use.

The present invention provides a cooking device for steam cooking. The cooking device includes:

a closed food cooking container configured to receive food to be cooked, the container including a base part and a lid part;

a steam generation device;

a support device configured to support the food cooking container;

a supply system configured to introduce a supply of steam into the food cooking container, the supply system including an inlet opening to the food cooking container and including a supply conduit connectable to the inlet opening, the supply conduit configured to supply steam so that at the inlet opening the steam enters tangentially to a wall of the food cooking container;

a control system configured to control the supply of steam into the food cooking container so as to perform a cooking process and so as to provide a difference between a pressure in the supply conduit and a pressure in an interior of the food cooking container of at least 1 kPa; and a temperature sensor configured to in communicate with the control system, the temperature sensor being connectable to the food cooking container.

The present invention provides numerous advantages. The cooking device fulfills all essential functions to allow food to be optimally steam-cooked in a closed food cooking container.

In the process, the steam is introduced into the food cooking container in a controlled manner. The insertion of a temperature sensor into the food cooking container allows the cooking process to be regulated and matched to the individual foods. This makes it possible to obtain optimal and high-quality cooking results with low energy consumption and a small excess of steam. Too high an excess of steam may be detrimental to the kitchen furniture and the kitchen. Possible consequence may include the formation of mold stains.

In an embodiment of the invention, air and steam that is too cold can also be removed from the cooking container in a controlled manner.

The coupling device of the present invention allows functionally important components to be coupled into the food cooking container. This is accomplished simply by inserting the food cooking container into the cooking device. Thus, after filling the food cooking container with the foods to be cooked, it can be directly connected to different steam cooking systems without any further operations, without the need to additionally connect the food cooking container to separate air-supply conduits, and without the need to additionally insert a separate temperature sensor into the food cooking container.

The inventive arrangement of the air- and/or steam-conveying supply and discharge conduits in the food cooking container prevents the possibility of a short-circuit occurring between the steam inlet and the steam outlet, which would result in low efficiency.

The inventive arrangement of the temperature sensor allows measurement of actual conditions in the food cooking container without the possibility of the temperature sensor being negatively affected by steam entering from the steam inlet or, when the steam generator is off, by air entering through the steam outlet.

Moreover, the entering steam is not directed directly toward the food, because this would lead to undesired cooking results. Altogether, due to the arrangement of the supply lines, the steam is uniformly distributed in the food cooking container, allowing a uniform cooking process to take place in all parts of the food that has been filled in.

The coupling device of the present invention, in conjunction with the closed food cooking container, makes it possible to conceive of simple possibilities of combination. Thus, for example, the steam cooking device may be used, in combined operation, in a device having microwave heating, since the coupling device containing the functionally important components for steam cooking can easily be made impervious to microwaves.

It is also conceivable to use food cooking containers in the form of ready-to-use packs filled with convenience food, which can, for example, be coupled to a coupling device of a docking station. The docking station can take the form, for example, of a wall-mounted unit. In any case, except for the food cooking containers, the docking station includes all other components of the device.

Altogether, due to the inventive construction of the cooking device, an easy-to-use appliance is provided which has a space-saving design, is relatively inexpensive to manufacture, and yet allows for optimal and high-quality cooking results.

Figure 1:
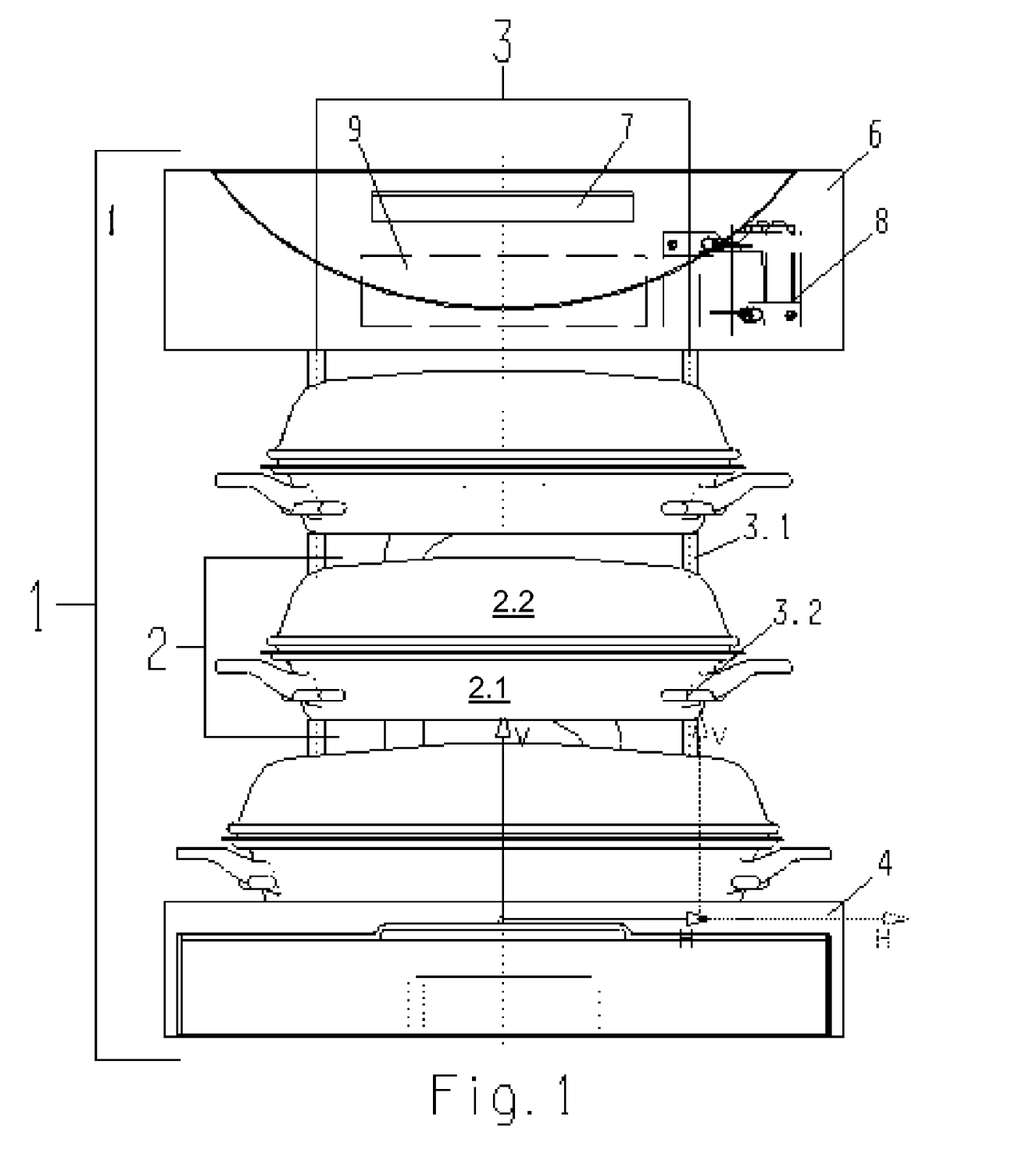
FIG. 1 is a front view of the device for cooking with steam.
Figure 2:
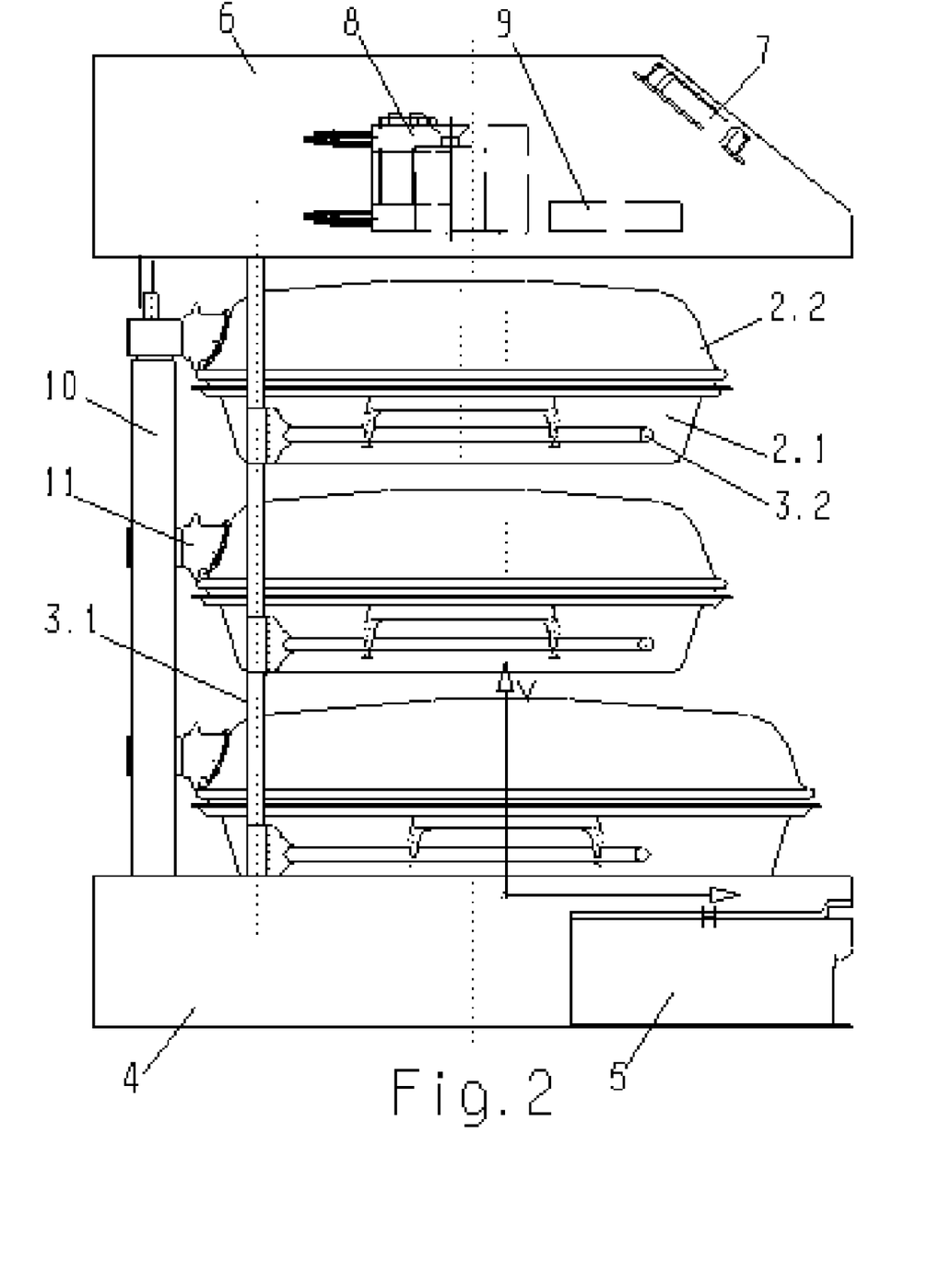
FIG. 2 is a side view of the steam cooking appliance of FIG. 1.

The device according to FIG. 1 and FIG. 2, which is designed as a steam cooking appliance 1, has food cooking containers 2, which include a base part 2.1 and a lid part 2.2, thus forming a closed food cooking container 2.

Food cooking containers 2 can be disposed one above the other in a terraced manner. For this purpose, they are received and held by a support device 3. Support device 3 includes vertical support members 3.1 and support arms 3.2.

A base 4 is formed in the lower area of appliance 1 and has a water reservoir 5 provided therein for water supply. Water reservoir 5 is supported in base 4 in a drawer-like manner.

A top part 6 is formed in the upper area of appliance 1. This top part 6 has arranged therein a display and operator control unit 7, a steam generator device 8, and the electric control system 9.

As can be seen from FIG. 2, appliance 1 has a central docking station 10 in the rear area, said central docking station having stationary coupling devices 11 arranged therein. Docking station 10 can fulfill the function of allowing food cooking containers 2 to be attached thereto, and of accommodating therein steam- and/or air conveying conduits, water conduits, and electrical wires, which will be described in greater detail hereinafter.

Food cooking containers 2 are provided with an opening in their rear area. This opening is located in lid part 2.2. When loading the appliance 1 for cooking, food cooking containers 2 are connected or plugged to coupling devices 11 via their openings. Coupling device 11 has integrated therein supply and discharge conduits 15, 16 for the steam, as well as a temperature sensor 20. In the embodiment according to FIGS. 1 and 2, food cooking containers 2 are supported and held by support arms 3.2, which reach underneath food cooking container 2 at the sides.

The operating principle of this embodiment is as follows:

The water stored in water tank 5 is pumped upwardly into steam generator device 8 by a pump. The steam produced by steam generator device 8 is passed through steam conduits disposed in docking station 10 and through coupling device 11 into the interior of food cooking containers 2. The steam supply is activated via operator control unit 7. Control system 9, in conjunction with temperature sensor 20, controls and regulates the cooking process.

In this appliance 1, coupling device 11 has a function which will be described in greater detail below with reference to FIGS. 3 through 6.

Coupling device 11 has a connecting part 12, which, when connected to a food cooking container 2, extends into the interior thereof. Adjacent to connecting part 12 is a part 13, which serves as a stop for food cooking container 2 in the attached position. Numeral 14 denotes a part of coupling device 11, in which are located supply conduit 15 for the steam supply and a discharge conduit 16 for discharging excess steam from food cooking container 2. However, it is also possible to supply fresh air from outside into food cooking container 2 through this discharge conduit 16 in the opposite direction.

Connecting part 12 of coupling device 11 is provided with lateral outlet openings 17 through which the steam can enter food cooking container 2. Arrows 18 shown in the drawing, and the dashed-line representation, illustrate how the steam is passed through coupling member 11 and its connecting part 12 into food cooking container 2. In principle, however, it is sufficient if outlet openings 17 are disposed perpendicular to the insertion direction of the respective food cooking container 2 in order for the entering steam not to be directed directly toward the food contained therein. As explained above, this would lead to an undesired cooking result.

In the present exemplary embodiment, the pressure difference between supply conduit 15 and the interior of food cooking container 2 is achieved in a particularly simple manner by means of the effective cross-sectional flow areas of outlet openings 17. Outlet openings 17 each have an interior diameter smaller than the interior diameter of supply conduits 15. Due to these flow obstructions, the pressure of the steam entering food cooking container 2 is reduced, as desired, and its speed is increased accordingly. Suitable interior diameters and required volumes of steam per unit of time and, thus, the required heat output of steam generator device 8, are determined by laboratory testing.

Moreover, in alternative embodiments, outlet openings 17 can be provided whose effective cross-sectional areas can be varied by control system 9 and suitable actuators as a function of the desired pressure difference.

To prevent, in a simple manner, the steam flow from being short-circuited between outlet openings 17 and discharge openings 21, outlet openings 17 are located at the sides of connecting part 12, as in the present exemplary embodiment, or at the top thereof, while discharge openings 21 are located at the bottom of connecting part 12. In this respect, see FIGS. 3 through 5.

Figure 5:
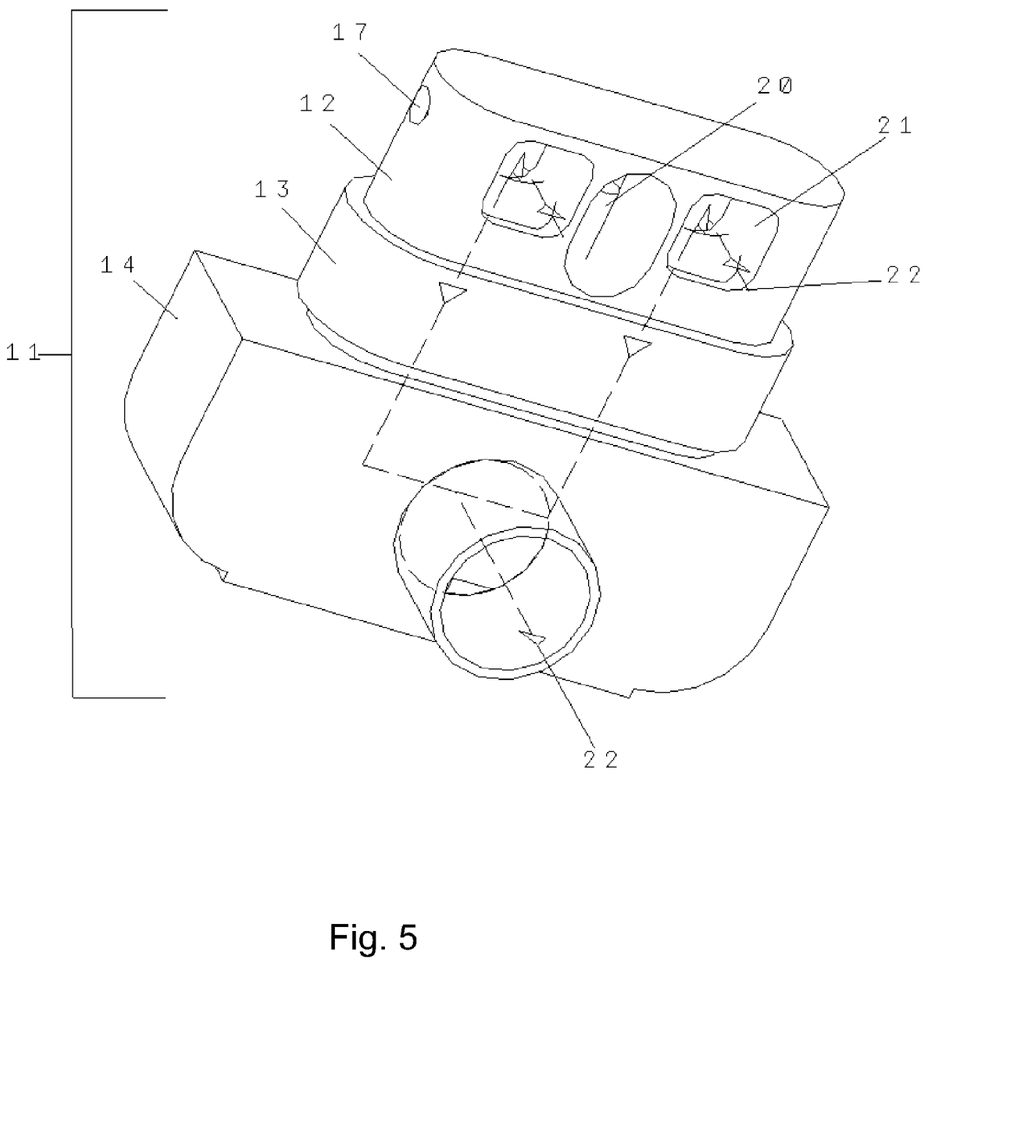
FIG. 5 is a bottom perspective view of the coupling device of the present invention.

From FIG. 5, it can be seen how the interior of food cooking container 2 communicates with the outside air. At the bottom side of connecting part 12, there can be seen discharge openings 21 through which excess steam, or steam that is too cold, can get from food cooking container 2 into discharge conduit 16 through the channels formed in coupling device 11. Arrows 22 and the dashed connecting lines illustrate the path that the steam from food cooking container 2 can take.

Figure 4:
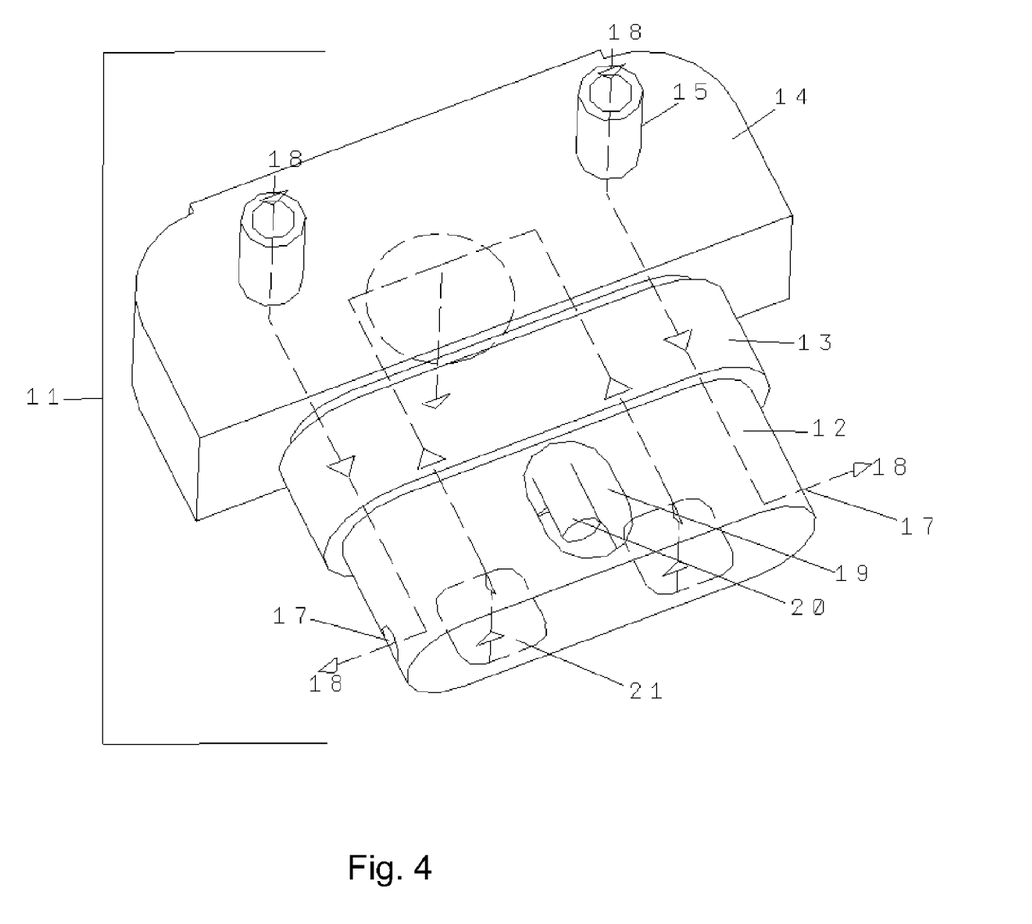
FIG. 4 is a top perspective view of the coupling device of the present invention.

Furthermore, connection part 12 of coupling device 11 has formed therein a channel 19 into which extends a temperature sensor 20, as is shown in greater detail in FIG. 4.

Figure 6:
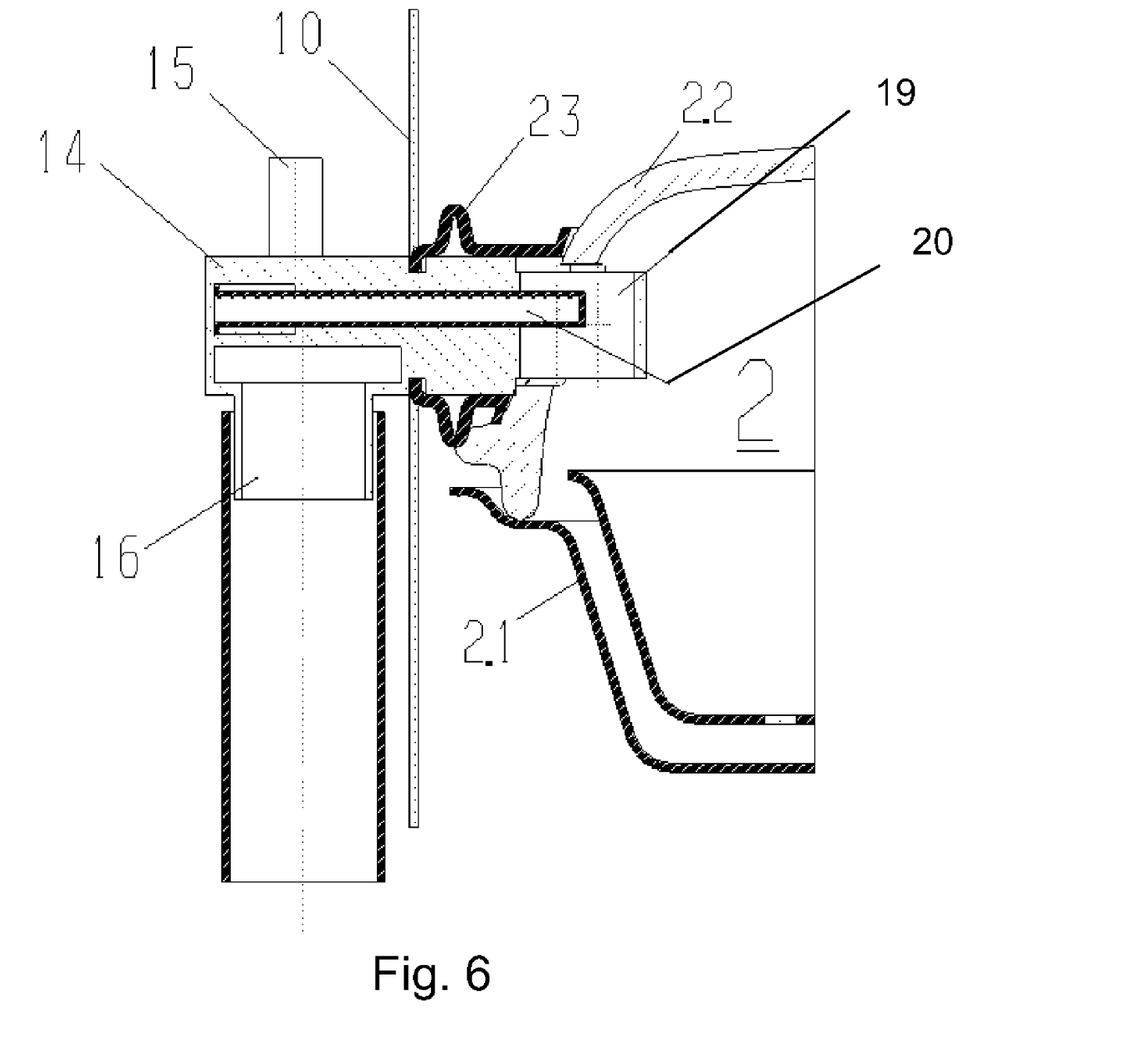
FIG. 6 is a partial cross-sectional view showing the coupling device and its connection to the food cooking container.
Figure 7:
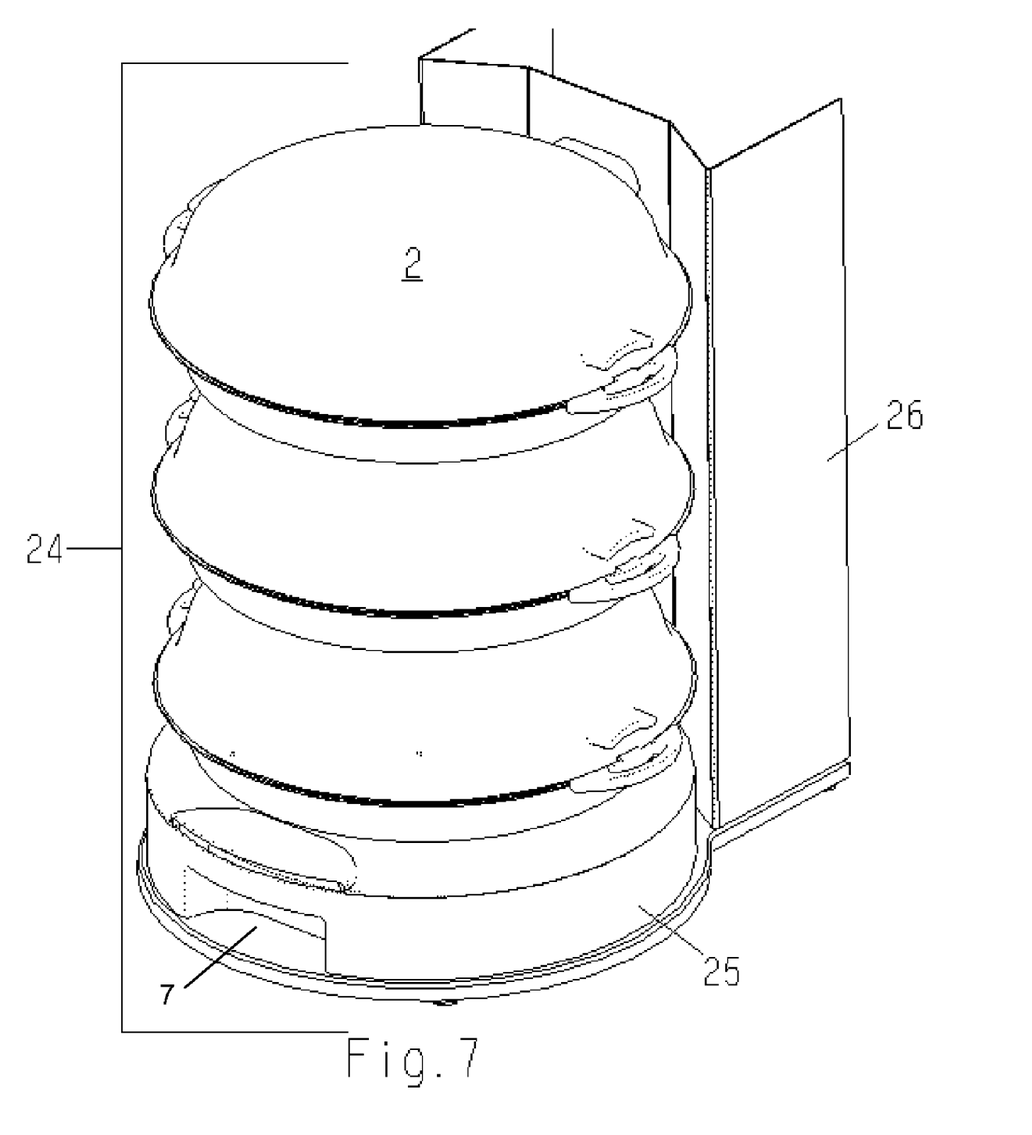
FIGS. 7-10 are perspective views of another variant of the steam cooking device which has a different design.
Figure 8:
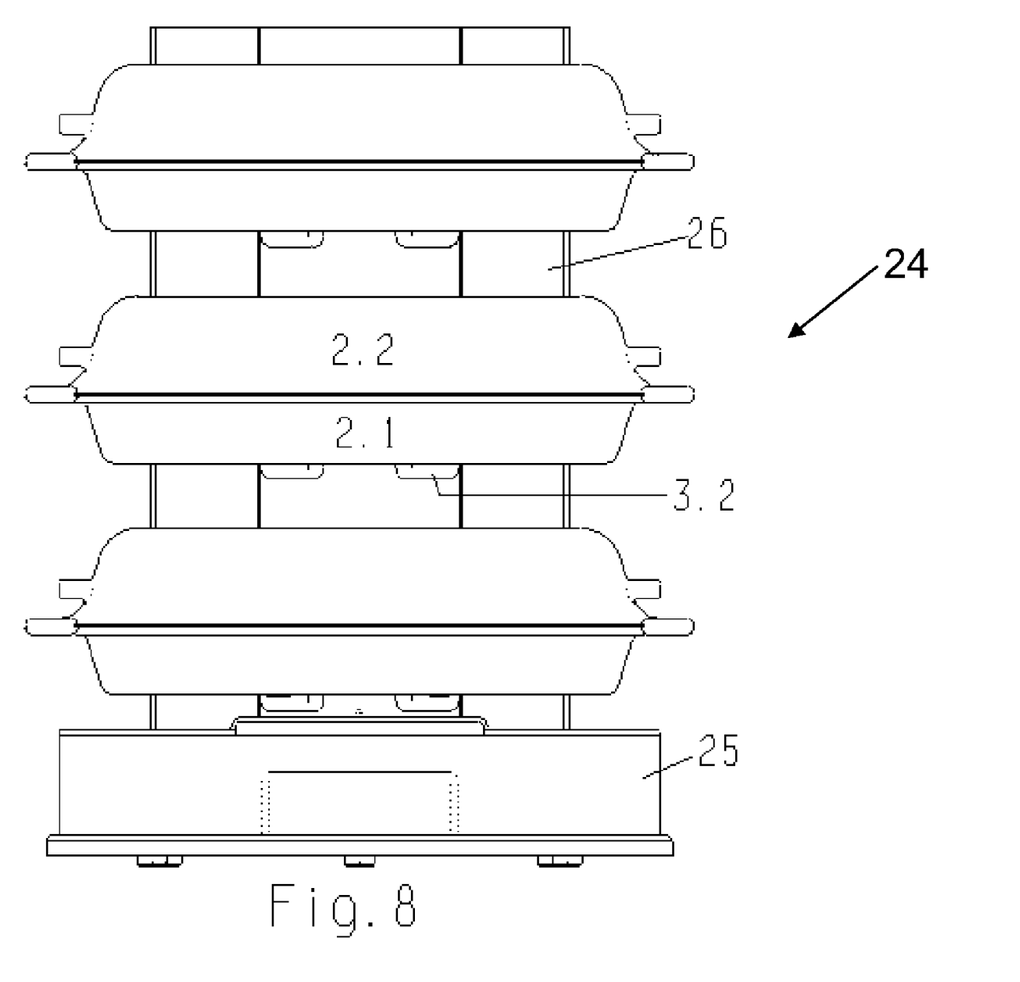
Figure 9:
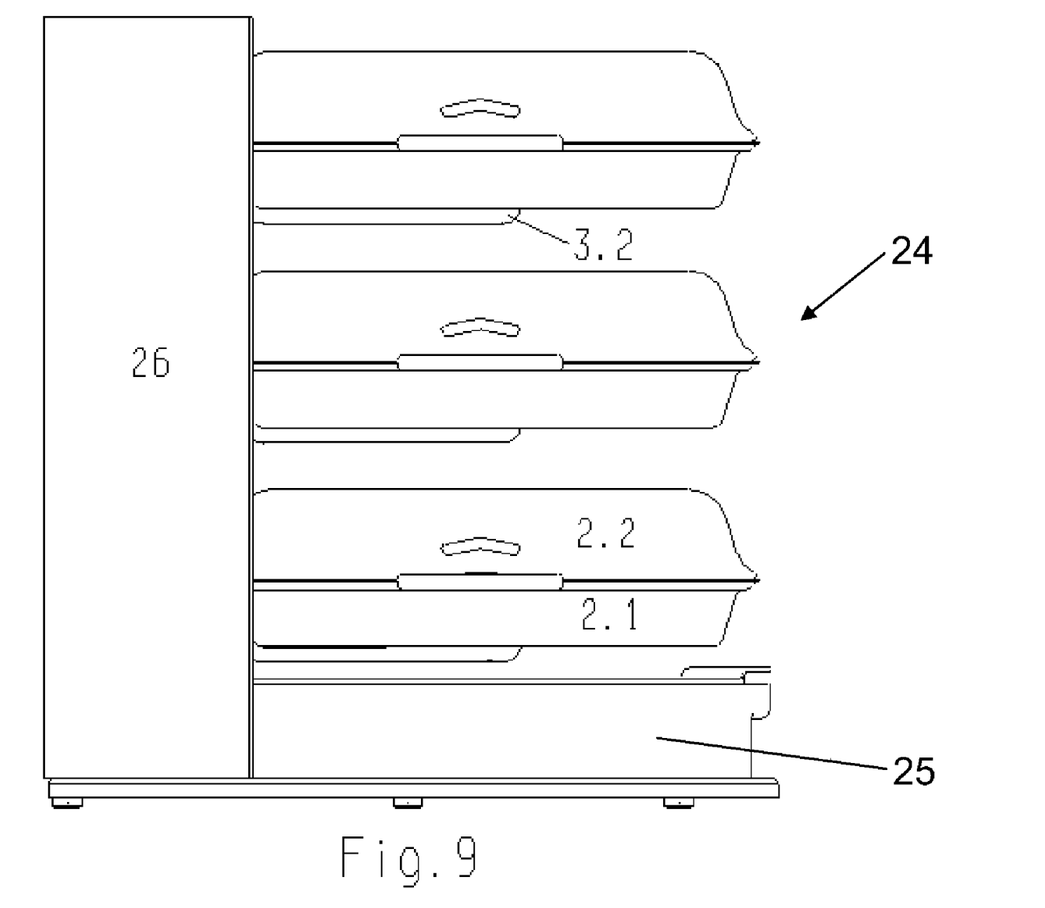

FIG. 6 is a partial cross-sectional view of coupling device 11 and a food cooking container 11 connected thereto.

Figure 3:
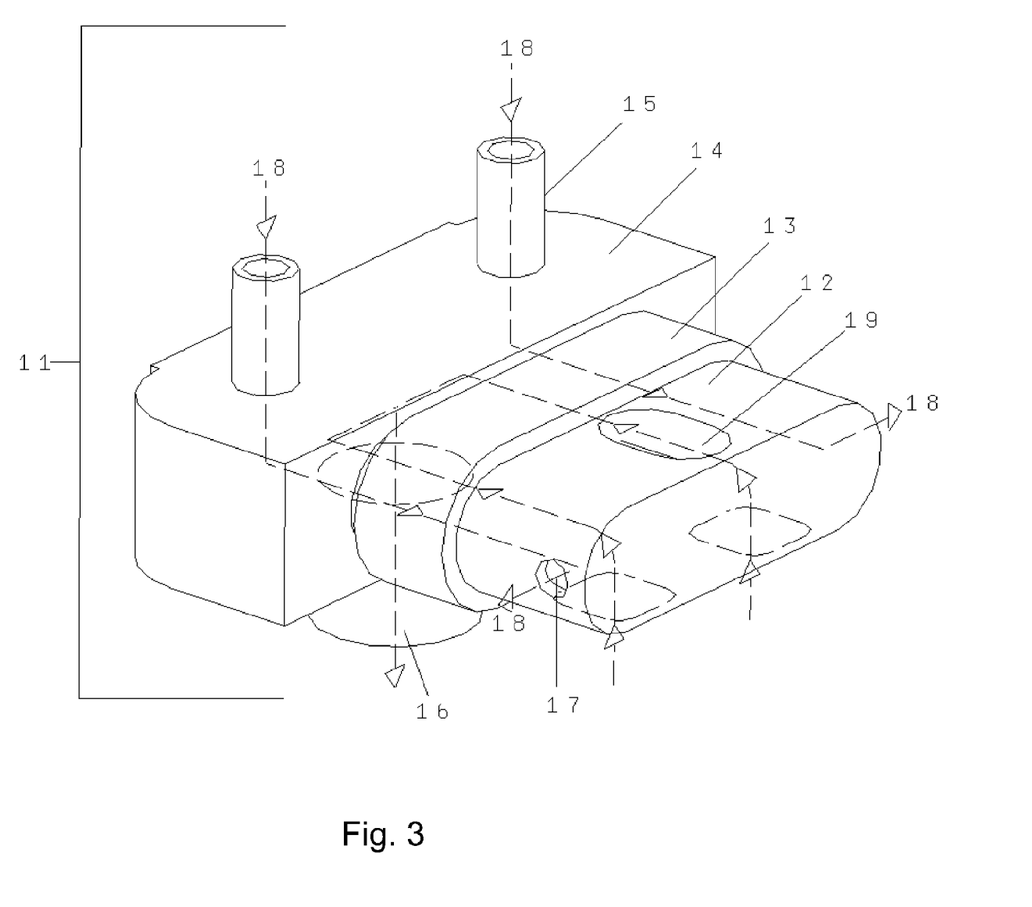
FIG. 3 is a perspective view of the coupling device according to the present invention.

The means described in the aforementioned FIGS. 3 through 5 have been given corresponding numerals here. It can additionally be seen in FIG. 6 that coupling device 11 is further provided with a bellows seal 23 providing a seal against the outer surface of food cooking container 2 when connected to coupling device 11.

In the present exemplary embodiment, connecting part 12 is substantially stiff, so that food cooking container 2 can be coupled to coupling device 11 only by sliding food cooking container 2 into or onto docking station 10. The user does not have to carry out any further operations, as would be necessary, for example, when using a connecting part in the form of a flexible hose.

FIGS. 7 through 10 show another variant of the cooking device according to the present invention. This cooking device 24 substantially includes the bottom part 25, docking station 26, and food cooking containers 2. Appliance 24 also has an operator control and display unit 7. The water reservoir, the steam generator device, and the control system of this appliance 24 can be located in bottom part 25, or else in docking station 26.

Figure 10:
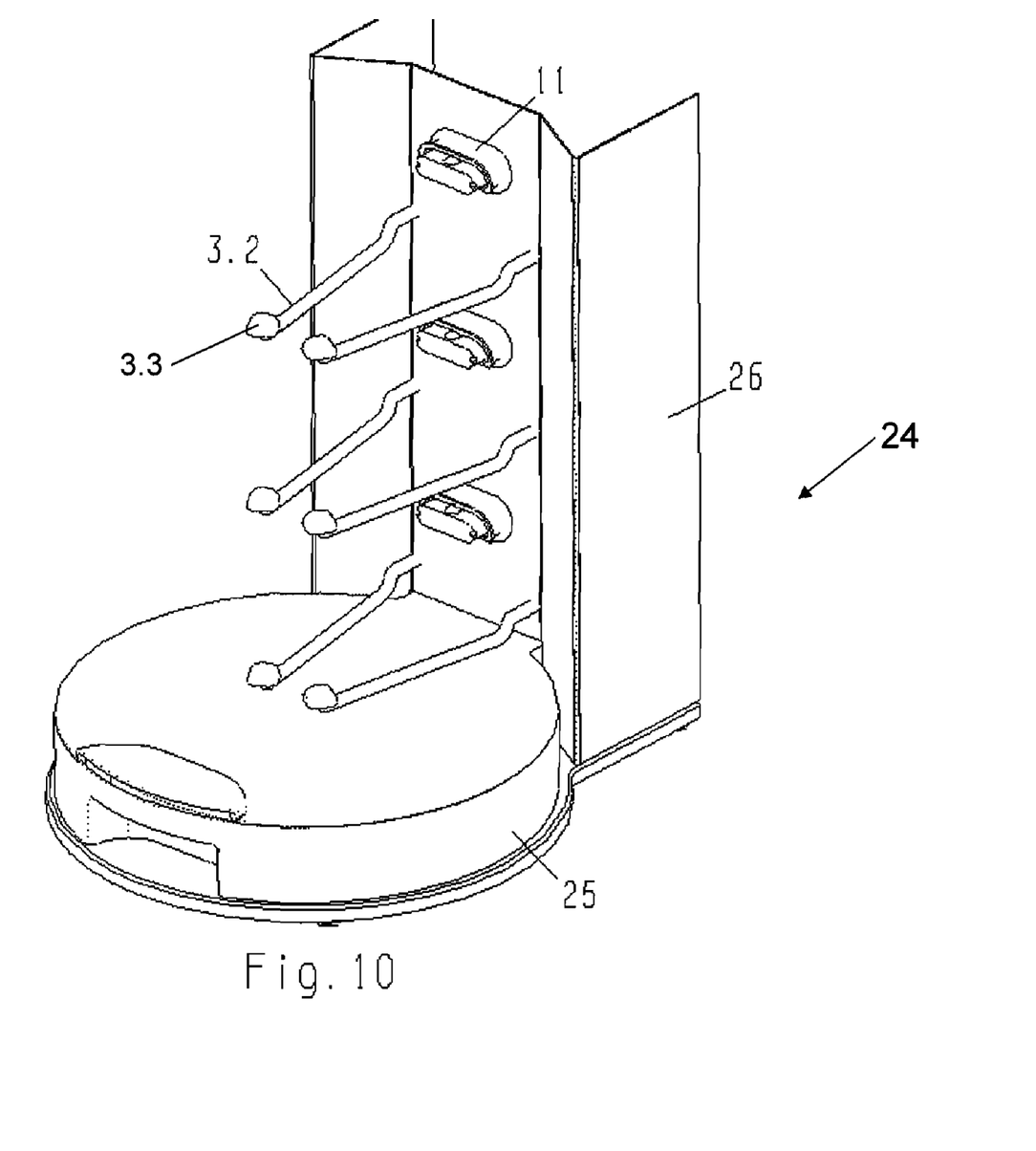

In order to hold the food cooking containers 2, this variant is provided with support arms 3.2 connected to central docking station 26, as shown in FIG. 10.

Docking station 26 accommodates all steam- and air-conveying and water-conveying conduits, as well as the electrical wires. These include, in particular, the steam-supply conduits and the discharge conduits for the steam to be introduced into or discharged from food cooking container 2. Also located therein are the conductor connections running between the temperature sensor integrated in coupling device 11 and the control system.

This appliance 24 can be operated in the same manner as in the exemplary embodiment according to FIGS. 1 through 6. After filling food cooking containers 2 with the food to be cooked, food cooking container 2 is directly coupled to coupling device 11 of docking station 26 via its opening provided on the rear. In this condition, food cooking container 2 is held in appliance 24 by support arms 3.2 in a cantilevered manner. The angular clamping members 3.3 formed at the front of support arms 3.2 latch to base part 2.1 of food cooking container 2, thus providing a secure fit in docking station 26.

Coupling device 11 according to the present invention can be used in steam cooking systems of different construction and, in fact, independently of the housing design and the arrangement of the water reservoirs, the steam generator device, and the control system.

Thus, combinations with other types of heating are made possible in a simple manner. Coupling device 11 can be used even in a microwave appliance, because the coupling device can easily be made impervious to microwaves.

The present invention is not limited to the exemplary embodiments described herein; reference should be had to the appended claim 1.

What is claimed is:

1. A method for steam cooking comprising:
introducing steam, from a steam generator device, into a food cooking container through a supply conduit so that at an inlet opening to the food cooking container the steam enters tangentially to a wall of the food cooking container; and
controlling a generation of the steam by a control system so as to provide a difference between a pressure in the supply conduit and a pressure in an interior of the food cooking container of at least 1 kPa,
wherein a temperature sensor is disposed at least partially in the food cooking container, and wherein the predetermined direction is away from the temperature sensor.

2. A method for steam cooking comprising:
introducing steam, from a steam generator device, into a food cooking container through a supply conduit so that at an inlet opening to the food cooking container the steam enters tangentially to a wall of the food cooking container;
controlling a generation of the steam by a control system so as to provide a difference between a pressure in the supply conduit and a pressure in an interior of the food cooking container of at least 1 kPa; and
imparting, by a flow guide element, a predetermined direction to the steam as the steam enters the food cooking container so as to provide an increased flow path of the steam from the input opening to a discharge opening of the food cooking container.

3. The method as recited in claim 2 wherein the increased flow path is a maximum flow path of the steam from the inlet opening to a discharge opening of the food cooking container.

4. A method for steam cooking comprising:
introducing steam, from a steam generator device, into a food cooking container through a supply conduit so that at an inlet opening to the food cooking container the steam enters tangentially to a wall of the food cooking container; and
controlling a generation of the steam by a control system so as to provide a difference between a pressure in the supply conduit and a pressure in an interior of the food cooking container of at least 1 kPa;
wherein the controlling the generation of the steam by the control system is performed so that the pressure in the interior of the food cooking container does not exceed about 0.3 kPa during a cooking process.

5. A cooking device for steam cooking, comprising:
a closed food cooking container configured to receive food to be cooked, the container including a base part and a lid part;
a steam generation device;
a support device configured to support the food cooking container;
a supply system configured to introduce a supply of steam into the food cooking container, the supply system including an inlet opening to the food cooking container and including a supply conduit connectable to the inlet opening, the supply conduit configured to supply steam so that at the inlet opening the steam enters tangentially to a wall of the food cooking container;
a control system configured to control the supply of steam into the food cooking container so as to perform a cooking process and so as to provide a difference between a pressure in the supply conduit and a pressure in an interior of the food cooking container of at least 1 kPa; and
a temperature sensor configured to communicate with the control system, the temperature sensor being connectable to the food cooking container,
wherein the food cooking container is connectable to a discharge conduit configured to discharge at least one of air and excess steam from the food cooking container.

6. The cooking device as recited in claim 5 wherein the cooking process includes a heating process.

7. The cooking device as recited in claim 5 wherein the supply conduit is included in a coupling device, the coupling device including a connecting part configured to engage an opening of the food cooking container in form-locking and steam-tight manner.

8. The cooking device as recited in claim 7 further comprising a second coupling device including a second supply conduit and configured to engage a second food container in form-locking and steam-tight manner.

9. The cooking device as recited in claim 7 wherein the coupling device is configured to be directly coupled to the food container during a loading of the cooking device.

10. The cooking device as recited in claim 7 wherein the coupling device includes a region disposed between the supply conduit and the connecting part, the region being configured so that the steam enters the food cooking container tangentially to the cooking chamber wall.

11. The cooking device as recited in claim 7 wherein the temperature sensor is included in the coupling device.

12. The cooking device as recited in claim 7 wherein the coupling device includes the discharge conduit configured to discharge at least one of air and steam from the food cooking container.

13. The cooking device as recited in claim 12 wherein the coupling device includes a channel configured to receive at least part of the temperature sensor so as to allow a cooking chamber atmosphere to flow around the temperature sensor.

14. A cooking device for steam cooking, comprising:
- a closed food cooking container configured to receive food to be cooked, the container including a base part and a lid pail;
- a steam generation device;
- a support device configured to support the food cooking container;
- a supply system configured to introduce a supply of steam into the food cooking container, the supply system including an inlet opening to the food cooking container and including a supply conduit connectable to the inlet opening, the supply conduit configured to supply steam so that at the inlet opening the steam enters tangentially to a wall of the food cooking container;
- a control system configured to control the supply of steam into the food cooking container so as to perform a cooking process and so as to provide a difference between a pressure in the supply conduit and a pressure in an interior of the food cooking container of at least 1 kPa;
- a temperature sensor configured to communicate with the control system, the temperature sensor being connectable to the food cooking container;
- wherein the supply conduit is included in a coupling device, the coupling device including a connecting part configured to engage an opening of the food cooking container in form-locking and steam-tight manner,
- wherein the temperature sensor is included in the coupling device;
- wherein the connecting part includes an opening disposed at a side of the coupling device thereof and configured to introduce the steam into the food cooking container therethrough.

15. The cooking device as recited in claim 11 wherein the coupling device includes a connecting part having a discharge opening configured to discharge steam from the food cooking container.

16. The cooking device as recited in claim 5 wherein the supply conduit is included in a coupling device configured to engage an opening of the food cooking container, and further comprising:
- a base and a top part;
- a support device disposed between the base and the top part, and configured to hold the cooking container; and
- a docking station disposed at a rear area of the cooking device, and configured to receive a water conduit, at least one of an air and a steam conduit, and an electrical wire;
- wherein the coupling device is attached to the docking station.

17. The cooking device as recited in claim 5 further comprising a bottom part and a docking station extending perpendicularly from the docking station, wherein the supply conduit is included in a coupling device configured to engage an opening of the food cooking container, and wherein the coupling device is disposed on the docking station, and wherein the support device is integrated in the docking station.

18. A coupling device for a cooking device, the coupling device comprising:
- a connecting part configured to engage an opening of a closed food cooking container in a form-locking and steamtight manner;
- a supply conduit connectable to an inlet opening of the food cooking container, the supply conduit being configured to supply steam so that at the inlet opening the steam enters tangentially to a wall of the food cooking container;
- a control system configured to control the supply of steam into the food cooking container so as to perform a cooking process and so as to provide a difference between a pressure in the supply conduit and a pressure in an interior of the food cooking chamber of at least 1 kPa;
- a temperature sensor; and
- a discharge conduit configured to discharge at least one of air and steam from the food cooking container.

* * * * *